US008560297B2

(12) United States Patent
Quirk et al.

(10) Patent No.: US 8,560,297 B2
(45) Date of Patent: Oct. 15, 2013

(54) LOCATING PARALLEL WORD SEQUENCES IN ELECTRONIC DOCUMENTS

(75) Inventors: Christopher Brian Quirk, Seattle, WA (US); Kristina N. Toutanova, Redmond, WA (US); Jason Robert Smith, Baltimore, MD (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/794,778

(22) Filed: Jun. 7, 2010

(65) Prior Publication Data
US 2011/0301935 A1 Dec. 8, 2011

(51) Int. Cl.
G06F 17/28 (2006.01)
G06F 17/27 (2006.01)
G06F 17/20 (2006.01)
G06K 9/72 (2006.01)

(52) U.S. Cl.
USPC ............ 704/2; 704/3; 704/4; 704/8; 704/9; 715/205; 382/229

(58) Field of Classification Search
USPC ............ 704/2, 3, 4, 8, 9; 715/205; 382/229
See application file for complete search history.

(56) References Cited

U.S. PATENT DOCUMENTS

| | | | |
|---|---|---|---|
| 6,321,191 B1 | 11/2001 | Kurahashi | |
| 6,757,646 B2 * | 6/2004 | Marchisio | 704/8 |
| 7,620,538 B2 * | 11/2009 | Marcu et al. | 704/2 |
| 8,249,855 B2 * | 8/2012 | Zhou et al. | 704/2 |
| 2003/0233222 A1 * | 12/2003 | Soricut et al. | 704/2 |
| 2004/0122656 A1 * | 6/2004 | Abir | 704/4 |
| 2005/0060643 A1 * | 3/2005 | Glass et al. | 715/501.1 |
| 2005/0228643 A1 * | 10/2005 | Munteanu et al. | 704/9 |
| 2006/0009963 A1 | 1/2006 | Gaussier et al. | |
| 2007/0250306 A1 | 10/2007 | Marcu et al. | |
| 2008/0120092 A1 | 5/2008 | Moore et al. | |
| 2008/0262826 A1 * | 10/2008 | Pacull | 704/3 |
| 2008/0300857 A1 * | 12/2008 | Barbaiani et al. | 704/4 |
| 2009/0076792 A1 * | 3/2009 | Lawson-Tancred | 704/2 |
| 2009/0083023 A1 * | 3/2009 | Foster et al. | 704/3 |
| 2010/0177970 A1 * | 7/2010 | King et al. | 382/229 |

OTHER PUBLICATIONS

Mining meaning from Wikipedia by Olena Medelyan, David Milne, Catherine Legg and Ian H. Witten, International Journal of Human-Computer Studies, 2009, pp. 716-754.*
Munteanu, et al., "Improved Machine Translation Performace via Parallel Sentence Extraction from Comparable Corpora.", Retrieved at << http://www.mt-archive.info/HLT-NAACL-2004-Munteanu.pdf >>, HLT-NAACL, 2004, pp. 1-8.

(Continued)

*Primary Examiner* — Pierre-Louis Desir
*Assistant Examiner* — Neeraj Sharma
(74) *Attorney, Agent, or Firm* — Medley, Behrens & Lewis, LLC

(57) ABSTRACT

Systems and methods for automatically extracting parallel word sequences from comparable corpora are described. Electronic documents, such as web pages belonging to a collaborative online encyclopedia, are analyzed to locate parallel word sequences between electronic documents written in different languages. These parallel word sequences are then used to train a machine translation system that can translate text from one language to another.

20 Claims, 5 Drawing Sheets

(56) References Cited

OTHER PUBLICATIONS

Wu, et al., "Inversion Transduction Grammar Constraints for Mining Parallel Sentences from Quasi-Comparable Corpora", Retrieved at << http://www.google.co.in/url?sa=t&source=web&ct=res&cd=4&ved=0CBcQFjAD&url=http%3A%2F%2Fciteseerx.ist.psu.edu%2Fviewdoc%2Fdownload%3Fdoi%3D10.1.1.75.5058%26rep%3Drep1%26type%3Dpdf&rct=j&q=extract+%22parallel+sentences%22+%2B+whole+document&ei=IZrJS-GNJc2lkAWW3Zn1BA&usg=AFQjCNFIZ1UDipq_JTgjHVsz2PJn7BEmhw >>, In Forthcoming, 2005, pp. 1-12.

Sarikaya, et al., "Iterative Sentence-Pair Extraction from Quasi-Parallel Corpora for Machine Translation", Retrieved at << http://www1.cs.columbia.edu/~smaskey/papers/sent_select_mt.pdf >>, In Interspeech, 2009, pp. 432-435.

Adafre, et al., "Finding Similar Sentences Across Multiple Languages in Wikipedia", Retrieved at << http://www.sics.se/jussi/newtext/working_notes/10_adafre_derijke.pdf >>, Proceedings of the 11th Conference of the European Chapter of the Association for Computational Linguistics, 2006, pp. 1-8.

Blunsom, et al., "Discriminative Word Alignment with Conditional Random Fields", Retrieved at << http://portal.acm.org/citation.cfm?id=1220184 >>, Annual Meeting of the ACL, Proceedings of the 21st International Conference on Computational Linguistics and the 44th annual meeting of the Association for Computational Linguistics, Jul. 17-18, 2006, pp. 65-72.

Brown, et al., "The Mathematics of Statistical Machine Translation: Parameter Estimation.", Retrieved at << http://acl.ldc.upenn.edu/J/J93/J93-2003.pdf >>, Computational Linguistics, Special issue on using large corpora: II, vol. 19, No. 2, Jun. 1993, pp. 1-50.

Fung, et al., "Multi-Level Bootstrapping For Extracting Parallel Sentences from a Quasicomparable Corpus", Retrieved at << http://www.mt-archive.info/Coling-2004-Fung-1.pdf >>, International Conference On Computational Linguistics, Proceedings of the 20th international conference on Computational Linguistics, Aug. 23-27, 2004, pp. 1-7.

Gale, et al., "Identifying Word Correspondences in Parallel Texts", Retrieved at << http://www.aclweb.org/anthology/H/H91/H91-1026.pdf >>, Speech and Natural Language, Proceedings of a Workshop, Feb. 19-22, 1991, pp. 152-157.

Haghighi, et al., "Learning Bilingual Lexicons from Monolingual Corpora", Retrieved at << http://www.aclweb.org/anthology/P/P08/P08-1088.pdf >>, In Proceedings of ACL-08: HLT, Jun. 2008, pp. 771-779.

Bar-Haim, et al., "The Second Pascal Recognising Textual Entailment Challenge", Retrieved at << http://citeseerx.ist.psu.edu/viewdoc/download?doi=10.1.1.132.9327&rep=rep1&type=pdf >>, In The Second PASCAL Recognising Textual Entailment Challenge, Apr. 10, 2006, pp. 1-9.

Koehn, et al., "Learning a Translation Lexicon from Monolingual Corpora", Retrieved at << http://www.aclweb.org/anthology/W/W02/W02-0902.pdf >>, Annual Meeting of the ACL, Proceedings of the ACL-02 workshop on Unsupervised lexical acquisition, vol. 9, Jul. 12, 2002, pp. 1-8.

Koehn, et al., "Statistical Phrase-Based Translation", Retrieved at << http://www.isi.edu/~marcu/papers/phrases-hlt2003.pdf >>, North American Chapter Of The Association For Computational Linguistics, Proceedings of the 2003 Conference of the North American Chapter of the Association for Computational Linguistics on Human Language Technology, vol. 1, May 27-Jun. 1, 2003, pp. 1-7.

Koehn, Philipp., "Europarl: A Parallel Corpus for Statistical Machine Translation", Retrieved at << http://www.mt-archive.info/MTS-2005-Koehn.pdf >>, In MT summit X, The tenth machine translation summit, 2005, pp. 79-86.

Lafferty, et al., "Conditional Random Fields: Probabilistic Models for Segmenting and Labeling Sequence Data", Retrieved at http://www.cis.upenn.edu/~pereira/papers/crf.pdf >>, Proceedings of the Eighteenth International Conference on Machine Learning, Jun. 28-Jul. 1, 2001, pp. 1-8.

Moore, Robert C., "Fast and Accurate Sentence Alignment of Bilingual Corpora", Retrieved at << http://citeseerx.ist.psu.edu/viewdoc/download?doi=10.1.1.91.198&rep=rep1&type=pdf >>, Lecture Notes In Computer Science, vol. 2499, Proceedings of the 5th Conference of the Association for Machine Translation in the Americas on Machine Translation: From Research to Real Users, Oct. 6-12, 2002, pp. 1-10.

Munteanu, et al., "Improving Machine Translation Performance by Exploiting Non-Parallel Corpora", Retrieved at << http://www.aclweb.org/anthology/J/J05/J05-4003.pdf >>, Computational Linguistics, vol. 31, No. 4, Dec. 2005, pp. 477-504.

Och, Franz J., "Minimum Error Rate Training in Statistical Machine Translation", Retrieved at << http://acl.ldc.upenn.edu/acl2003/main/pdfs/Och.pdf >>, Annual Meeting of the ACL, Proceedings of the 41st Annual Meeting on Association for Computational Linguistics, vol. 1, Jul. 7-12, 2003, pp. 1-8.

Papineni, et al., "BLEU: A Method for Automatic Evaluation Of machine Translation", Retrieved at << http://acl.ldc.upenn.edu/acl2002/MAIN/pdfs/Main076.pdf >>, Annual Meeting of the ACL, Proceedings of the 40th Annual Meeting on Association for Computational Linguistics, Jul. 7-12, 2002, pp. 1-8.

Rapp, Reinhard., "Automatic Identification of Word Translations from Unrelated English and German Corpora", Retrieved at << http://acl.ldc.upenn.edu/P/P99/P99-1067.pdf >>, Annual Meeting of the ACL, Proceedings of the 37th annual meeting of the Association for Computational Linguistics on Computational Linguistics, Jun. 20-26, 1999, pp. 519-526.

Resnik, et al., "The Web as a Parallel Corpus", Retrieved at << http://www.cs.cmu.edu/afs/cs.cmu.edu/Web/People/nasmith/papers/resnik+smith.cl03.pdf >>, Computational Linguistics, Special issue on web as corpus, vol. 29, No. 3, Sep. 2003, pp. 349-380.

Tillmann, et al., "A Simple Sentence-level Extraction Algorithm for Comparable Data", Retrieved at << http://www.aclweb.org/anthology/N/N09/N09-2024.pdf >>, Human Language Technology Conference, Proceedings of Human Language Technologies, The 2009 Annual Conference of the North American Chapter of the Association for Computational Linguistics, Companion Volume: Short Papers, May 31-Jun. 5, 2009, pp. 93-96.

Tillmann, Christoph., "A Beam-search Extraction Algorithm for Comparable Data", Retrieved at << http://www.aclweb.org/anthology/P/P09/P09-2057.pdf >>, Annual Meeting of the ACL, Proceedings of the ACL-IJCNLP 2009, Conference Short Papers, Aug. 4, 2009, pp. 225-228.

Vogel, et al., "HMM-based Word Alignment in Statistical Translation", Retrieved at << http://www.aclweb.org/anthology/C/C96/C96-2141.pdf >>, International Conference On Computational Linguistics, Proceedings of the 16th conference on Computational linguistics, vol. 2, Aug. 5-9, 1996, pp. 836-841.

Zhao, et al., "Adaptive Parallel Sentences Mining from Web Bilingual News Collection", Retrieved at << http://www.cs.cmu.edu/~bzhao/publications/ICDM2002_SentAlign.pdf >>, ICDM, Proceedings of the 2002 IEEE International Conference on Data Mining, Dec. 9-12, 2002, pp. 745-748.

\* cited by examiner

LOCATING PARALLEL WORD SEQUENCES IN ELECTRONIC DOCUMENTS

BACKGROUND

Machine translation refers to the utilization of a computing device to translate text or speech from a source natural language to a target natural language. Due to complexities in natural languages, however, executing a translation between natural languages is a non-trivial task.

Generally, machine translation systems are learned systems that are trained through utilization of training data. Pursuant to an example, labeled training data can include word sequence pairs that are either translations of one another or are not translations of one another. These word sequence pairs are labeled and provided to a learning system that learns a model based at least in part upon this labeled training data. Thus, machine translation systems are trained in such a way that they can translate a word sequence not included in the training data by observing how translation between a source language and target language works in practice with respect to various word sequences in the training data.

It can be ascertained that acquiring more training data that can be utilized to train a machine translation system causes translations output by a machine translation system to be increasingly accurate. Several languages have a significant amount of training data associated therewith. Thus, many conventional machine translation systems are quite adept at translating between, for example, English and Spanish. For other languages, however, there is a lack of training data that can be utilized to train a machine translation system that is desirably configured to translate between such languages. In an example, a lack of training data exists that allows for machine translation systems to efficiently translate between German and Bulgarian, for example.

One manner for obtaining this training data is to have individuals that can speak both German and Bulgarian, for example, manually label word sequences (e.g., as being parallel to one another or not parallel to one another). This labeled data may then be used to train a machine translation system that is configured to translate between the German and Bulgarian languages, for instance. Manually labeling training data, however, is a relatively monumental task, particularly if a great amount of training data is desired.

SUMMARY

The following is a brief summary of subject matter that is described in greater detail herein. This summary is not intended to be limiting as to the scope of the claims.

Various technologies pertaining to acquiring training data for a machine translation system are described herein. These technologies include utilizing electronic sources that have heretofore not been considered for obtaining parallel data. These sources include online collaborative dictionaries/encyclopedias. Such an encyclopedia may include various documents in multiple different languages that discuss a substantially similar subject. Therefore, for instance, such a collaborative encyclopedia may comprise a first entry about a first topic written in the German language and may also comprise a second entry about the same topic written in the Bulgarian language. Such documents may be direct translations of one another, partial translations of one another or authored entirely separate from one another. That the electronic documents are in some way related can be inferred, for instance, as oftentimes links exist between the documents in the collaborative online encyclopedia. In another example, each of the documents may include a link to a substantially similar image. Furthermore, entries in the online collaborative encyclopedia pertaining to a substantially similar topic may include links in the text to substantially similar web pages (e.g., web pages that are also linked as being related to one another), etc. Other sources of information are also contemplated, such as news sources that publish news about events in different languages, though in this case determining the related document pairs may be more challenging. As an example, documents that have similar person names in the title and are published within one week of one another might be considered related.

As indicated above, word sequences in documents of different languages may or may not be direct translations of one another. Regardless, these sources may be good sources for obtaining parallel data that can be used for training a machine translation system. Accordingly, also described herein are technologies pertaining to ascertaining if a word sequence in a first electronic document written in a first language is parallel to a word sequence in a second electronic document that is written in a second language. For example, electronic documents that are known to be related to one another can be analyzed and word sequences can be generated through analysis of these documents. In one example, a word sequence can be an entire sentence. In another example, a word sequence may be a phrase. A word sequence in the first electronic document in the first language can be selected and paired separately with each word sequence in the second electronic document to create word sequence pairs. A score may be assigned to each word sequence pair, wherein the score is indicative of whether or not the word sequences in the word sequence pair are parallel to one another (e.g., whether the first word sequence is parallel to the other word sequence in the word sequence pair). The higher the score assigned to the word sequence pair, the greater the probability that the two word sequences in the word sequence pair are parallel to one another. Thus, a ranked list of word sequence pairs can be output.

With more detail pertaining to assigning scores, scores can be assigned to sequence pairs through utilization of any suitable method/mechanism. For instance, a ranker can be trained through utilization of manually labeled parallel word sequence pairs and non-parallel word sequence pairs. In addition, the ranker can be trained to take into consideration the global configuration of electronic documents. That is, in many sources it may be common for parallel word sequences to occur in clusters. The ranker can consider such alignment when assigning scores to word sequence pairs.

A threshold value may then be compared to a highest score assigned to a word sequence pair. If the score is above the threshold value, then a label can be assigned to the word sequence pair indicating that the word sequences in the word sequence pair are parallel to one another (e.g., translations of one another). If no score is above the threshold value, then a null value can be assigned to the first word sequence which indicates that the first word sequence does not have a corresponding parallel word sequence in the second electronic document. As an example, the threshold value may be selected by the user before executing the system.

In another exemplary embodiment, a substantially optimal (in terms of being parallel) second language word sequence may be sought for each first language word sequence. Given a first language word sequence, a ranker described herein can score every pairing with second language word sequences, as well as the pair of the first the language word sequence and the empty word sequence. A label may then be assigned to the second language word sequence assigned the highest (or best)

score unless the best scoring second language word sequence is the empty word sequence, in which case the null value is assigned to the aforementioned first language word sequence. In this way, a separate threshold is automatically selected for each first language word sequence.

Furthermore, an exemplary ranker described herein need not consider each first language word sequence in isolation. Instead, the ranker may assign scores to particular word sequence alignments across documents (e.g., whole documents or a collection of word sequences between documents), where every first language word sequence is labeled with either a corresponding second language word sequence or the empty word sequence. In this way, the ranker can look at adjacent information to affect its score. As an example, it may be expected that parallel word sequences tend to occur in clusters, and the ranker can output a high score to correspondences where this phenomenon occurs.

Other aspects will be appreciated upon reading and understanding the attached figures and description.

DETAILED DESCRIPTION

Figure 1:
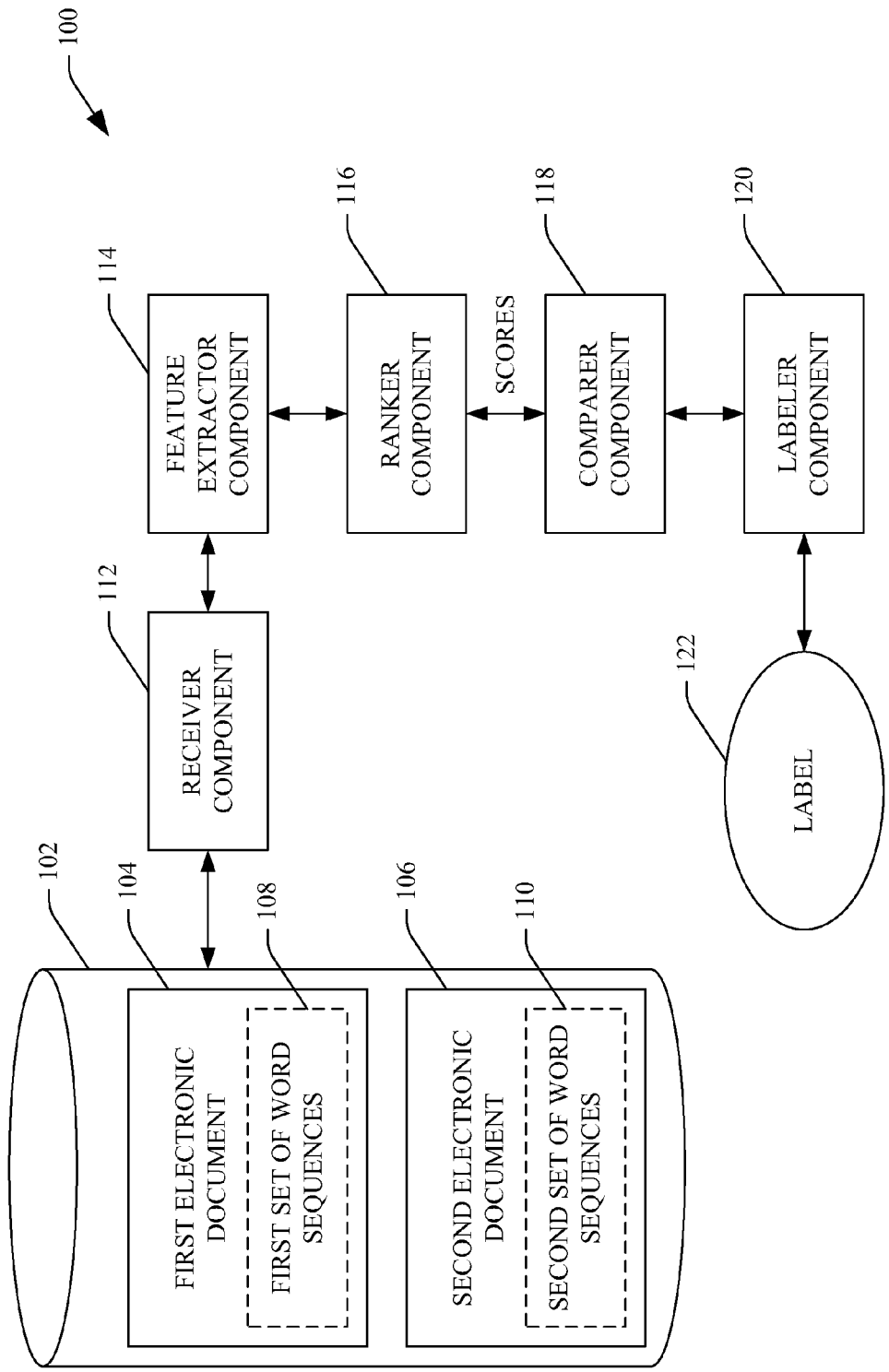
FIG. 1 is a functional block diagram of an example system that facilitates assigning a label to a word sequence pair that indicates that word sequences in such pair are parallel to one another.

Various technologies pertaining to extracting parallel word sequences from aligned comparable electronic documents will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates acquiring parallel word sequences from aligned, related electronic documents is illustrated. The system 100 includes a data store 102 that comprises a first electronic document 104 and a second electronic document 106. The first electronic document 104 can include a first set of word sequences 108 and the second electronic document 106 can include a second set of word sequences 110. In an example, these word sequences can be sentences. In another example, the word sequences can be multi-word phrases.

A receiver component 112 can receive the first electronic document 104 and the second electronic document 106 from the data store 102. A feature extractor component 114 is in communication with the receiver component 112 and can extract features from the first electronic document 104 and the second electronic document 106, respectively. Example features that can be extracted will be described in greater detail below.

In a first exemplary embodiment, the ranker component 116 can receive the features extracted by the feature extractor component 114 and based at least in part upon such features can assign scores to word sequence pairs between word sequences in the first electronic document 104 and the second electronic document 106. Pursuant to an example, the first set of word sequences 108 can include a first word sequence. This first word sequence can be paired individually with each word sequence in the second set of word sequences 110, thereby creating a plurality of word sequence pairs. The ranker component 116 can assign a score to each word sequence pair, wherein the score can be indicative of an amount of parallelism between the word sequences in the word sequence pair. As used herein, the term "parallelism" can refer to word sequences having a substantially similar semantic meaning.

A comparer component 118 can receive the scores assigned to the word sequence pairs by the ranker component 116 and can compare a highest score output by the ranker component 116 with a threshold value. A score above the threshold value indicates that it is relatively highly probable that the word sequences in the corresponding word sequence pair are parallel to one another, while a score below the threshold value can indicate that it is more likely that the second set of word sequences 110 in the second electronic document 106 does not include a word sequence that is parallel to the aforementioned first word sequence.

A labeler component 120 can be in communication with the comparer component 118 and can assign a label to the word sequence pair. For example, the labeler component 120 can label a word sequence pair as including parallel word sequences if the comparer component 118 found that the score assigned to the word sequence pair is above the threshold. Additionally, the labeler component 120 can be configured to label word sequence pairs assigned a score below a threshold by the ranker component 116 as not being parallel word sequences.

In a second exemplary embodiment (which can operate in combination with the first exemplary embodiment), the ranker component 116 can receive the aforementioned features and can assign scores to a plurality of different possible alignments between word sequences in the first electronic document 104 and word sequences in the second electronic document 106. For instance, each word sequence in the first set of word sequences 108 can be labeled with either a corresponding word sequence in the second set of word sequences 110 or an empty word sequence. The ranker component 116 may then assign a score to a possible alignment, wherein the alignment refers to the aforementioned alignment of word sequences in the first set of word sequences with the respective word sequences in the second set of word sequences as evidenced by the labels. In this way, the ranker component 116 can take into consideration adjacency of word sequences when assigning a score assigned to an alignment. As an example, it may be expected that parallel word sequences tend to occur in clusters, and the ranker component 116 can output a high score to correspondences where this phenomenon occurs. The ranker component 116 can assign scores to a plurality of different possible alignments, and may cause a highest assigned score (and corresponding alignment) to be stored in the data repository 102. This score is indicative of a probability that word sequences in the first set of word sequences 108 in the particular alignment are parallel to corresponding word sequences in the second set of word sequence 110 in the particular alignment. In an example, this score can be taken into consideration when assigning scores to particular word sequence pairs as described above. Alternatively, possible alignments can be selected based at least in part upon scores assigned to word sequence pair, wherein such scores are assigned as described above.

Exemplary embodiments of the system 100 will now be described. In a first embodiment the system 100 can be configured to locate parallel word sequences in electronic documents that are written in different languages. Thus, the first set of word sequences 108 can be written in a first language and the second set of word sequences 110 can be written in a second language. Moreover, the first electronic document 104 and the second electronic document 106 may each be web pages. Pursuant to a particular example, the web pages may belong to a collaborative online encyclopedia that includes entries on various topics in several different languages. Therefore, the first electronic document 104 may pertain to a particular topic written in a first language and the second electronic document 106 may pertain to the same topic but is written in the second language. In an example, the relationship between the first electronic document 104 and the second electronic document 106 can be known based upon links between the first electronic document 104 and the second electronic document 106. For instance, the online collaborative encyclopedia may link entries pertaining to substantially similar topics that are written in different languages. In another example, the online collaborative encyclopedia may store images in a common repository, and entries written in different languages that link to the same image may be deemed to be related. Still further, hyperlinks in electronic documents can be compared to see whether such hyperlinks link to a substantially similar page or pages that are known to be related (e.g., entries pertaining to different topics written in different languages).

In another example, the first electronic document 104 and the second electronic document 106 may be web pages pertaining to news items. That is, the first electronic document 104 may be a news item written in a first language pertaining to a particular event and the second electronic document 106 may be a news item pertaining to a substantially similar event but written in the second language. With respect to the online sources described above, the second electronic document 106 may be a direct translation of the first electronic document 104. However, in some cases some word sequences in the second set of word sequences 110 may be translations of some word sequences in the first set of word sequences 108 while other word sequences in the second set of word sequences 110 are not parallel with word sequences in the first set of word sequences 108. For example, if the first electronic document 104 and the second electronic document 106 are obtained from an online collaborative encyclopedia, the first electronic document 104 may be written by a first author in the first language about a particular topic. The second electronic document 106 may be written by a second author in the second language, and the second author may have used some of the language in the first electronic document 104 and placed a translation thereof in the second electronic document 106 in the second language. For instance, a multi-lingual individual may have written the second electronic document 106 and may have directly translated at least some text from the first electronic document 104 to the second electronic document 106. Other authors, however, may have generated original text which does not align with text in the first electronic document 104. Since the first electronic document 104 and the second electronic document 106 are known to be related and may be comparable, however, such documents 104 and 106 may still be good sources for obtaining parallel word sequences in the first and second languages, respectively.

As mentioned above, the feature extractor component 114 can extract features from word sequences in the first set of word sequences 108 and the second set of word sequences 110. The feature extractor component 114 can be configured to extract features from each word sequence pair of interest. Such features extracted by the feature extractor component 114 can include but are not limited to features derived from word alignments, distortion features, features derived from a markup of an online collaborative encyclopedia and/or word level induced lexicon features. Pursuant to an example, word sequences in the first electronic document 104 and the second electronic document 106 can be aligned through utilization of a known/existing word alignment model. The features derived from word alignments refer to such alignment output by the known alignment model. These features include the log probability of an alignment, a number of aligned/unaligned words, longest aligned sequence of words, and a number of words with fertility 1, 2 and 3 or above. Additionally, two more features that can be classified as being derived from word alignments can include a sentence length feature that models the length ratio between source and target word sequences with a Poisson distribution, and a difference in relative document position of the two word sequences which captures the idea that aligned electronic documents have similar topic progression. Such features can be defined on word sequence pairs and are contemplated by the ranker component 116 when assigning scores to word sequence pairs.

Distortion features can refer to reviewing the difference between position of previous and currently aligned word sequences. A first set of distortion features can bin such distances while a second set of features can look at the absolute difference between an expected position (one after the previously aligned word sequence) and an actual position.

Features derived from an online collaborative encyclopedia can include a number of matching links in a particular sequence pair of interest. Such links can be weighted by their inverse frequency in the document such that a link that appears often does not contribute much to such features value. Another feature that can be derived from the markup of the online collaborative dictionary is an image feature which can be set to a particular value when two word sequences are captions of a same image. A list feature can have a particular value when two word sequences in a word sequence pair are both items in a list. The image feature and the list feature can fire with a negative value when the feature matches on one word sequence and not another. None of the above features fire on a null alignment. There is also a bias feature for these two models which fires on all non-null alignments.

Furthermore, as indicated above, word-level induced lexicon features can be extracted from the feature extractor component 114. Pursuant to an example, a lexicon model can be built using an approach similar to ones developed for unsupervised lexicon induction from monolingual or comparable documents corpora. This lexicon model and its utilization by the feature extractor component 114 in connection with word sequence extraction is described herein. The lexicon model can be based on a probabilistic model P ($w_t|w_s$, T, S) where $w_t$ is a word in the target language and $w_s$ is a word in the source language and T and S are linked articles in the target and source languages, respectively. This model can be trained through utilization of any suitable training technique. Specifically, word pairs can be aligned during training rather than word sequence pairs. Such a model can be trained from a relatively small set of annotated article pairs (e.g., articles in an online collaborative encyclopedia) where for some words in the source language, one or more words are marked as corresponding to the source word (in the context of the article pair) or it is indicated that the source word does not have a corresponding relation in the target article. The word level annotated articles are disjoined from the word sequence aligned articles described herein.

The following features are used in the lexicon model and can be extracted by the feature extractor component 114. The first feature is a transition probability which is the transition probability $p(w_t|w_s)$ from a suitable word alignment model that is trained on particular seed parallel data. This probability can be utilized bi-directionally as well as the log probabilities in the two directions.

Another feature that can be extracted from the first electronic document 104 and/or the second electronic document 106 by the feature extractor component 114 can be a position difference, which is an absolute value of a difference in relative position of words $w_s$ and $w_t$ in articles S and T.

Another word-level induced lexicon feature that can be extracted by the feature extractor component 114 is a feature indicative of orthographic similarity. Orthographic similarity is a function of the added distance between source and target words. The added distance between words written in different alphabets is computed by first performing a deterministic phonetic translation of the word to a common alphabet. This translation is inexact and thus can be subject to improvement.

In yet another example of a word-level induced lexicon feature, the feature extractor component 114 can be configured to extract a context translation probability. The context translation probability feature can review all words occurring next to word $w_s$ in the article S and next to $w_t$ in the article T in a local context window (e.g., one word to the left and one word to the right of the subject word). Several scoring functions can be computed measuring the translation correspondence between the context (e.g., using a particular model trained from seed parallel data). This feature is similar to distributional similarity measures used in previous work with a difference that it is limited to context of words within a linked article pair.

Still another example of a word-level induced lexicon feature that can be extracted from the first electronic document 104 and the second electronic document 106 includes distributional similarity. The distributional similarity feature corresponds more closely to context similarity measures used in existing work on lexicon induction. For each source head word $w_s$, a distribution over context positions $o \in \{-2, -1, +1, +2\}$ is collected and context words $v_s$ in those positions are also collected based on a count of times a context word occurred at that offset from a head word: $P(o,v_s|w_s) \propto \text{weight}(o) \cdot C(w_s, o, v_s)$. Adjacent positions $-1$ and $+1$ have a weight of 2; other positions have a weight of 1. Likewise, a distribution over target words and context for each target head word can be gathered: $P(o,v_t|w_t)$. Using an existing word translation table $P(v_t|v_s)$ estimated on the seed parallel corpus, a cross-lingual context distribution can be estimated as the following: $P(o,v_t|w_s) = \Sigma_{v_s} P(v_t|v_s) \cdot P(o,v_s|w_s)$. The similarity of words $w_s$ and $w_t$ can be defined as 1 minus the Jensen-Shannon divergence of a distribution over positions and target words.

As described previously, the ranker component 116 can receive these features extracted from the electronic documents 104 and 106 from the feature extractor component 114 and can output a ranked list of word sequence pairs that are indicative of an amount of parallelism between word sequences in such word sequence pairs. The ranker component 116 can utilize two separate models for outputting ranked lists of word sequence pairs. The first ranking model used by the ranker component 116 can, for each word sequence in the source document, (the first electronic document 104) can select either a word sequence in the target document (second electronic document 106) that it is parallel to or assign a null value to the word sequence in the source document. Furthermore, the ranker component 116 can be or include a model that models a global alignment of word sequences between the first electronic document 104 and the second electronic document 106. In this exemplary model, the first set of word sequences 108 and the second set of word sequences 110 are observed, and for each source word sequence a hidden variable can indicate the corresponding target sequence in the target document to which the source word sequence is aligned. Pursuant to an example, this model can be a first order linear chain conditional random field (CRF). Of course, other suitable models are also contemplated by the inventors and are intended to fall under the scope of the hereto appended claims.

The features extracted by the feature extractor component 114 can be provided to the ranker component 116 and the ranker component 116 can assign a score to each word sequence pair, wherein the score is indicative of an amount of parallelism between word sequences in the word sequence pair. Additionally, during training of the ranker component 116 the features described above can be utilized to train the ranker component 116. More particularly, given the set of feature functions described above, the weights of a log linear ranking model for $P(w_t|w_s, T, S)$ can be trained based at least in part upon the word level annotated article pairs. After this model is trained, a new translation table $P_{lex}(t|s)$ can be generated which can be defined as $P_{lex}(t|s) \propto \Sigma_{t \in T, s \in S} P(t|s, T, S)$. The summation is over occurrences of the source and target word in linked articles (articles known to be in some way related). This new translation table can be used to define another HMM word alignment model (together with distortion probabilities trained from parallel data) for use in sentence or word sequence extraction models. Two copies of each feature using the HMM word alignment model can be generated, one using the seed data HMM model and another using this new HMM model.

The comparer component 118 and the labeler component 120 can act as described above in connection with assigning the label 122 to a word sequence pair. Again this label 122 can indicate that a word sequence in the second set of word sequences 110 is a translation of a word sequence in the first set of word sequences 108.

In another embodiment, the system 100 can be utilized to identify paraphrases of word sequences written in the same language. That is, the first electronic document 104 and the second electronic document 106 can include the first set of word sequences 108 and the second set of word sequences 110, wherein such word sequences 108 and 110 are written in the same language. The feature extractor component 114 can extract at least some of the features mentioned above from the first electronic document 104 and the second electronic document 106 and the ranker component 116 can rank word sequence pairs as indicated previously. Scores output by the ranker component 116 can be indicative of a likelihood that word sequences in scored word sequence pairs are paraphrases of one another. The comparer component 118 can compare a highest score assigned to word sequences considered by the ranker component 116, and if the highest score is above a threshold value, can instruct the labeler component 120 to label the word sequences in the word sequence pair as being paraphrases of one another.

Paraphrases ascertained through utilization of the system 100 can be employed in practice in a variety of settings. For example, such paraphrases can be utilized in a search engine such that if a user submits a query, the search engine can execute a search over a document corpus utilizing such query as well as paraphrases of such query. In a similar example, the user may submit a query to a search engine and the search engine may execute a search over a document corpus utilizing the query and a modification of such query, wherein such modification includes paraphrases of word sequences that exist in the query. Furthermore, paraphrases ascertained through utilization of the system 100 can be employed in connection with advertising. For example, a user may submit a query to a search engine and the search engine can sell advertisements pertaining to such query by selling paraphrases of the query to advertisers that are willing to bid on such paraphrases.

If the system 100 is employed in connection with locating translations between word sequences in different languages such identified parallel word sequences can be utilized in a variety of settings. For example, a labeled word sequence pair with respect to a first language and a second language could be provided to a system that is configured to learn a machine translation system. This machine translation system may then be utilized to translate text from the first language to the second language. In another example, word sequences that are labeled as being substantially parallel to one another when such word sequences are written in different languages can be employed in a multi-lingual search setting. For example, a user may wish to formulate a query in a first language because the user is more comfortable with writing in such language, but the user may wish to receive the search results in a second language. These word sequence pairs can be employed in connection with automatically translating a query from the first language to the second language to execute a search over a document corpus that comprises documents in the second language. Other utilizations of word sequence alignments are contemplated and intended to fall under the scope of the hereto appended claims.

Figure 2:
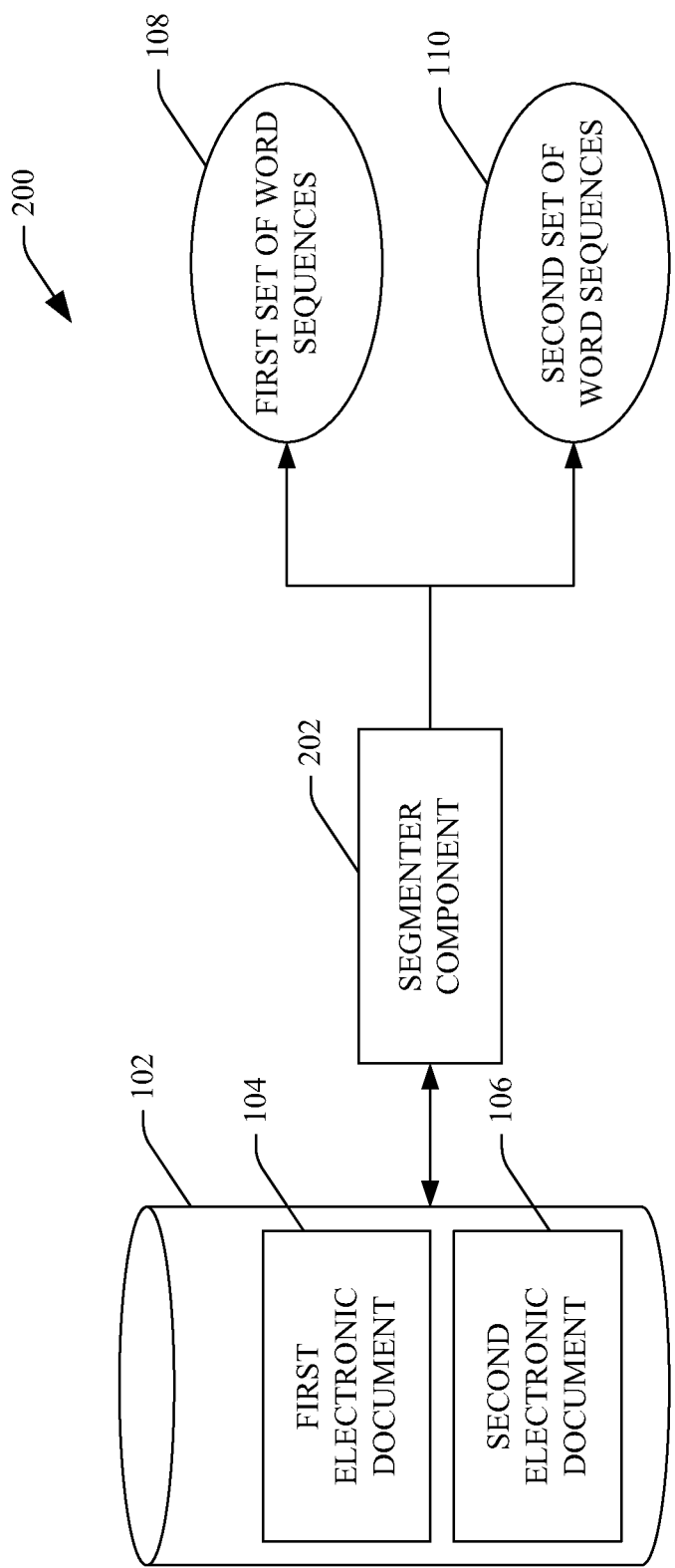
FIG. 2 is a functional block diagram of an example system that facilitates segmenting electronic documents into word sequences.

Referring now to FIG. 2, an example system 200 that facilitates extracting word sequences from electronic documents is illustrated. The system 200 includes a data store 102 that comprises the first electronic document 104 and the second electronic document 106. A segmenter component 202 can analyze linguistic features in the first electronic document 104 and the second electronic document 106 and can extract word sequences from such electronic documents. Pursuant to an example, the segmenter component 202 can be configured to extract sentences from the electronic documents 104 and 106. In such a case the segmenter component 202 can be configured to search for certain types of punctuation including periods, question marks, etc. and can extract word sequences by selecting text that is between such punctuation marks. In another example, the segmenter component 202 can be configured to analyze content of electronic documents 104 and 106 to extract certain types of phrases. For instance, the segmenter component 202 can search for certain noun/verb arrangements or other parts of a language and can extract word sequences based at least in part upon such analysis. Thus, the segmenter component 202 can output the first set of word sequences 108 and the second set of word sequences 110 that correspond to the first electronic document 104 and the second electronic document 106 and can cause such sets of word sequences 108 and 110 to be stored in the data store 102.

Figure 3:
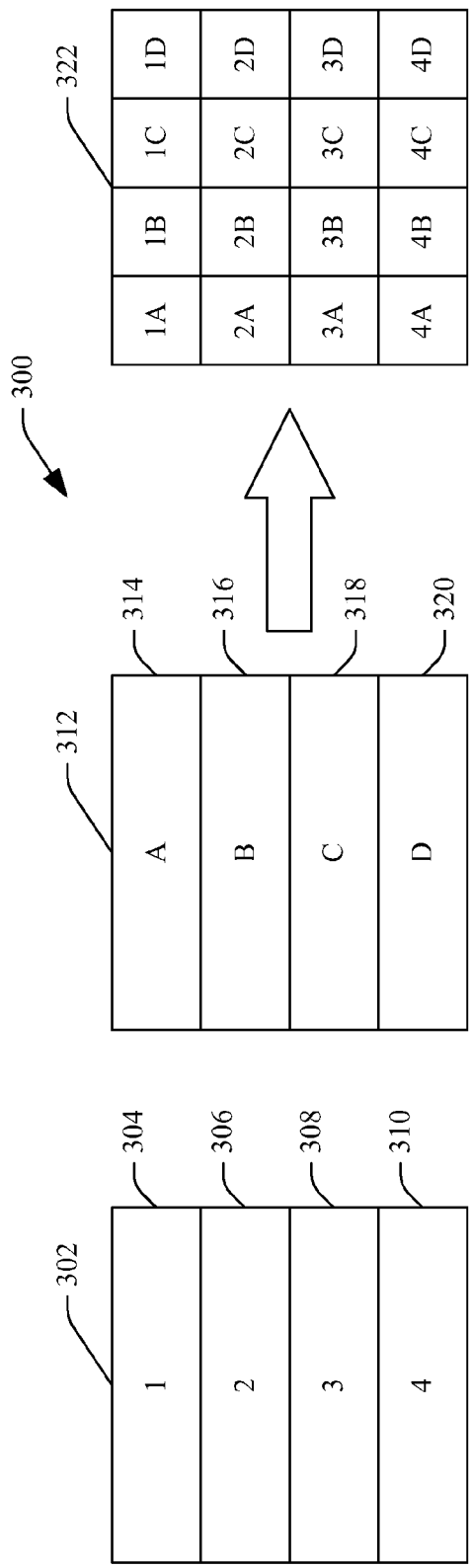
FIG. 3 is an example depiction of word sequence pairs.

With reference now to FIG. 3, an example depiction 300 of assigning scores to word sequence pairs existent in a first electronic document and a second electronic document is illustrated. A first electronic document 302 can comprise multiple word sequences 304-310. These word sequences are labeled respectively as 1, 2, 3 and 4 and may be written in a first language.

A second electronic document 312 can comprise multiple word sequences 314-320 wherein such word sequences are in a second language. The electronic document 302 and 312 may be somehow related such as for example two articles in different languages in an online collaborative encyclopedia that are linked to one another. Thus, a word sequence in the electronic documents 302-312 may be translations of one another, may be partial translations of one another or may not be translations of one another.

As described above a first model can be utilized to indicate probabilities of alignments between word sequences in the electronic document 302 and 312. That is, for each word sequence in a first electronic document 302 a value can be assigned with respect to a word sequence pair regarding whether a particular word sequence in the electronic document 312 is aligned with such word sequence in the electronic document 302 and such alignment information can be utilized in connection with assigning scores to word sequence pairs.

Thereafter, each word sequence in a first electronic document 302 can be paired with each word sequence in the second electronic document 312 and such word sequence pairs can be assigned scores. Thus, as is shown in an example matrix 322 with respect to word sequence 1 (shown by reference numeral 304), such word sequence is paired with each of the word sequences 314 and 320 in the second electronic document 312. These word sequence pairs are shown in the matrix 322 by the values 1A, 1B, 1C and 1D. The ranker component 116 (FIG. 1) can assign a score to each of those word sequence pairs. Thereafter, as described previously, a highest score assigned to the word sequence pairs 1A, 1B, 1C, and 1D can be compared to a threshold value, and if such highest score is above the threshold value, then the corresponding word sequence pair can be labeled as including parallel word sequences. Therefore, if the word sequence pair 1A is assigned the highest score amongst the word sequence pairs 1A, 1B, 1C, and 1D and such score is above the threshold value, then the word sequence pair 1A can be labeled as parallel such that the word sequence A 314 is labeled as being a translation of the word sequence 1 304. As can be seen in the matrix 322, scores can be assigned to each possible word sequence pair between the electronic documents 302 and 312.

In another exemplary embodiment, in addition to or alternatively to assigning scores individually to word sequence pairs, scores can be assigned to different alignments of word sequences in the electronic documents 302 and 312. In this case, an empty second language word sequence can exist (as an additional row in the matrix 322), and the matrix 322 can include binary values, with a single "1" in each column (which indicates that a word sequence in the first electronic document corresponds with a certain word sequence in the second electronic document or the empty word sequence) and the remainder "0" in every column. The ranker may then assign scores to the entirety of the matrix. This score is indicative of parallelism between word sequences in the scored alignment.

Figure 4:
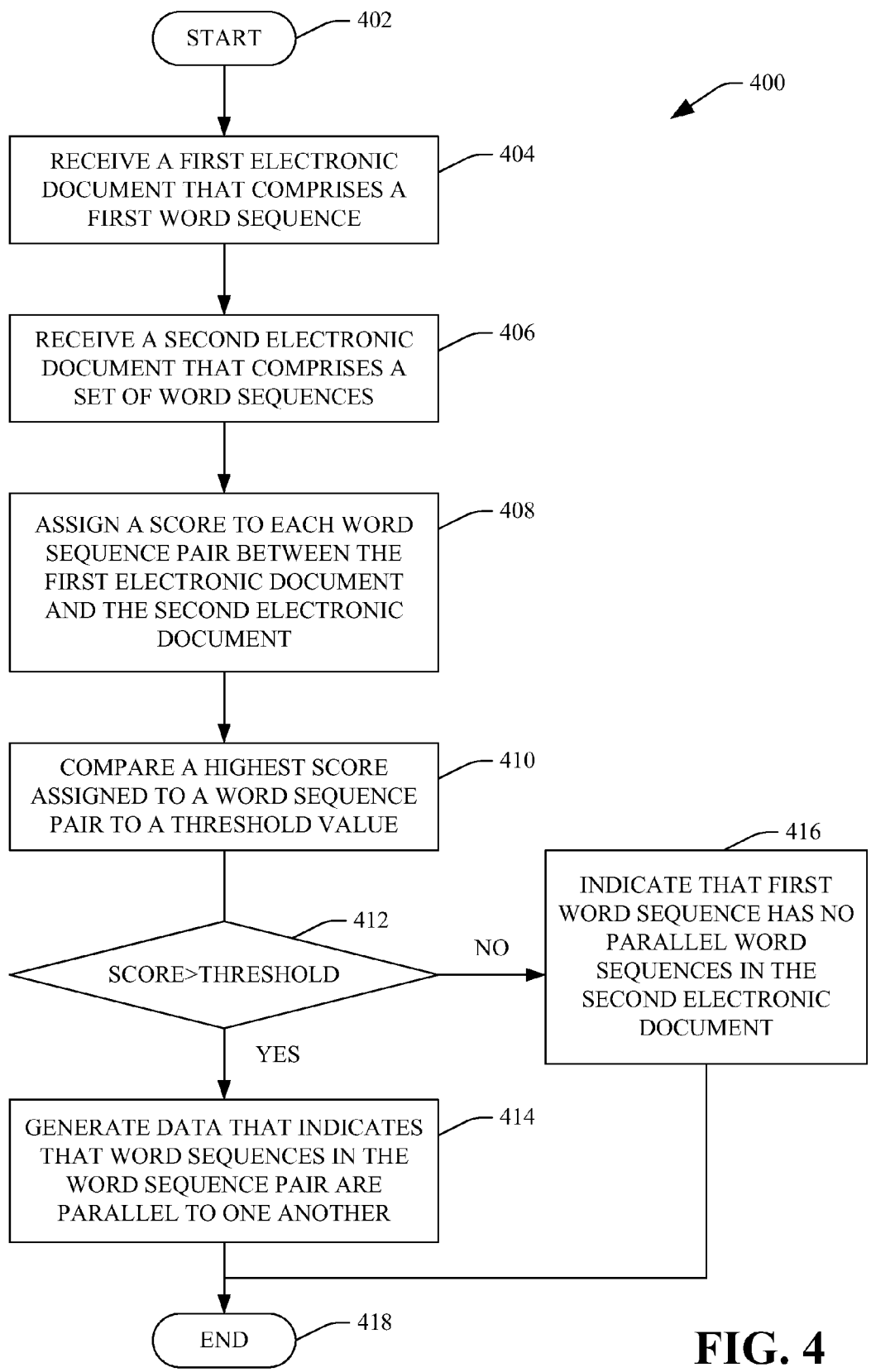
FIG. 4 is a flow diagram that illustrates an example methodology for labeling a word sequence pair to indicate that word sequences in such pair are parallel to one another.

With reference now to FIG. 4, an example methodology 400 that facilitates determining whether two word sequences in a word sequence pair are parallel to one another is illustrated. While the methodology 400 is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement the methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

The methodology 400 begins at 402, and at 404 a first electronic document that comprises a first word sequence is received. In an example, the first word sequence can be written in a first language.

At 406, a second electronic document is received, wherein the second electronic document comprises a set of word sequences. In an example, the set of word sequences can be written in a second language. Furthermore, as described herein, the first and second electronic documents may be web pages such as related web pages that belong to an online collaborative encyclopedia.

At 408, a score is assigned to each word sequence pair. The score can be indicative of an amount of parallelism between the first word sequence and the other word sequences in the respective word sequence pairs.

At 410, a highest score assigned to the word sequence pairs is compared to some threshold value. At 412, a determination is made regarding whether the score is above the threshold. If the score is above the threshold then at 414 data is generated that indicates that the word sequences in the word sequence pairs are parallel to one another. For example, the data can indicate that the word sequence from the set of word sequences in the word sequence pair is a translation of the first word sequence. In another example the data can indicate that the two word sequences in the word sequence pair are paraphrases of one another.

If at 412 it is determined that the highest score is below the threshold then at 416 data is generated that indicates that the first word sequence does not have a corresponding parallel word sequence in the second electronic document. The methodology then completes at 418.

Figure 5:
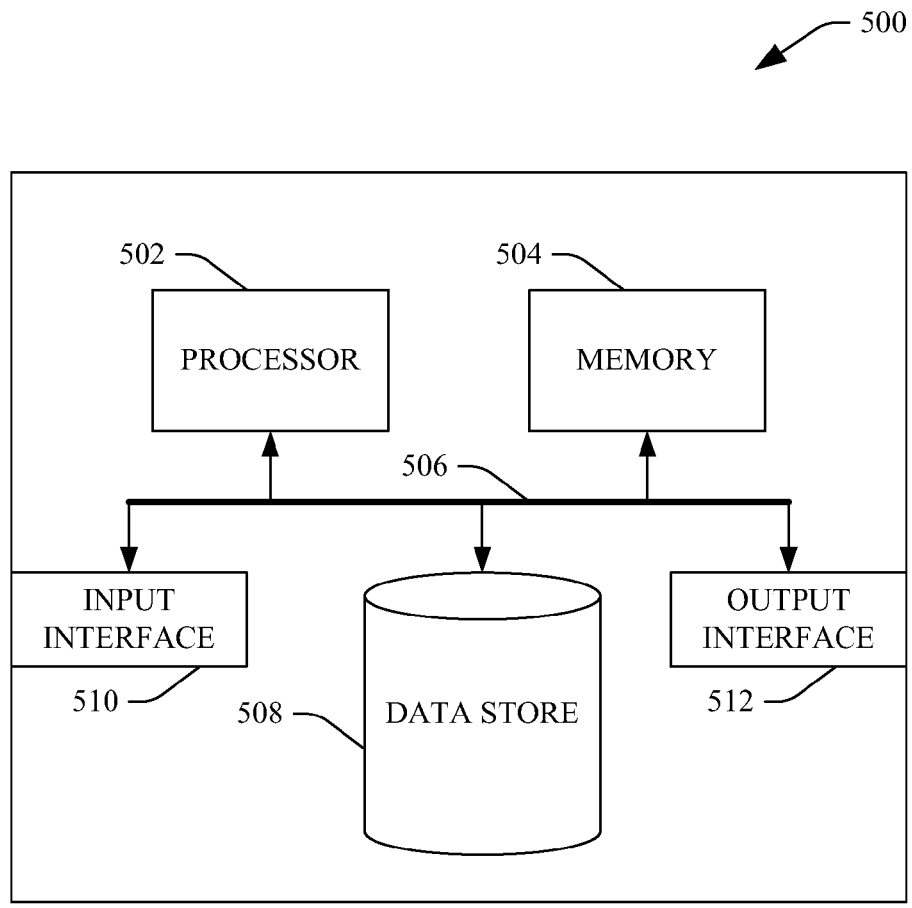
FIG. 5 is an example computing system.

Now referring to FIG. 5, a high-level illustration of an example computing device 500 that can be used in accordance with the systems and methodologies disclosed herein is illustrated. For instance, the computing device 500 may be used in a system that supports detecting parallel word sequences in electronic documents. In another example, at least a portion of the computing device 500 may be used in a system that supports extracting parallel word sequences from web pages that belong to an online collaborative encyclopedia. The computing device 500 includes at least one processor 502 that executes instructions that are stored in a memory 504. The memory 504 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store electronic documents, word sequences, ranking models, word sequence pairs, data indicating that words in a word sequence pair are parallel to one another, etc.

The computing device 500 additionally includes a data store 508 that is accessible by the processor 502 by way of the system bus 506. The data store 508 may be or include any suitable computer-readable storage, including a hard disk, memory, etc. The data store 508 may include executable instructions, electronic documents which may be web pages, word sequences, etc. The computing device 500 also includes an input interface 510 that allows external devices to communicate with the computing device 500. For instance, the input interface 510 may be used to receive instructions from an external computer device, a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
    receiving a first electronic document, wherein the first electronic document comprises a first set of word sequences;
    receiving a second electronic document, wherein the second electronic document comprises a second set of word sequences, wherein a word sequence pair comprises a word sequence from the first set of word sequences and a word sequence from the second set of word sequences or an empty word sequence, and wherein the second document comprises a hyperlink to the first document;
    automatically correlating the first electronic document and the second electronic document based at least in part upon the hyperlink;
    assigning a respective label to each word sequence pair to generate a plurality of possible alignments of word sequences in the first set of word sequences with respect to word sequences in the second set of word sequences;
    assigning respective scores to a plurality of different alignments, wherein a score is based at least in part upon a plurality of features comprising:
        a first distortion feature that indicates a difference between a position of a previously aligned word sequence and a currently aligned word sequence with respect to at least one word sequence in the first set of word sequences and the respective word sequences in the second set of word sequences; and
        a second distortion feature that is indicative of a difference between:
            an actual position of the currently aligned word sequence in the second electronic document relative to the previously aligned word sequence in the second electronic document; and
an expected position of the currently aligned word sequence in the second electronic document, the expected position being adjacent to the previously aligned word sequence; and
causing a highest score assigned to an alignment amongst all scores assigned to the plurality of different alignments to be stored in a data repository, wherein the score is indicative of an amount of parallelism between word sequences aligned in the alignment.

2. The method of claim 1, wherein the word sequences in the first set of word sequences are in a first language and the word sequences in the second set of word sequences are in a second language.

3. The method of claim 2, wherein the highest score is utilized to train a statistical machine translation system that is configured to translate text in the first language to text in the second language.

4. The method of claim 2, wherein the first electronic document and the second electronic document are a first web page and a second web page, respectively.

5. The method of claim 4, further comprising:
determining that the first web page and the second web page are directed toward the same subject matter based at least in part upon the second electronic document comprising the hyperlink to the first electronic document; and
automatically correlating the first web page with the second web page based at least in part upon the determining that the first web page and the second web page are directed toward the same subject matter.

6. The method of claim 5, wherein the first web page and the second web page are from an online collaborative encyclopedia.

7. The method of claim 1, wherein the score is assigned based at least in part upon features derived from word alignments between words in word sequences in the first set of word sequence and words in the respective word sequences in the second set of word sequences.

8. The method of claim 1, wherein the score is assigned based at least in part upon word-level induced lexicon features between words in at least one word sequence in the first set of word sequences and words in the respective word sequences in the second set of word sequences.

9. A computing apparatus, comprising:
a processor; and
a memory that is configured with components that are executable by the processor, the components comprising:
a receiver component that receives:
a first electronic document that comprises a first set of word sequences; and
a second electronic document that comprises a second set of word sequences and a hyperlink to the first electronic document, wherein the first electronic document is automatically correlated with the second electronic document based at least in part upon the hyperlink to the first electronic document in the second electronic document;
a feature extractor component that extracts a plurality of features based on the first electronic document and the second electronic document, the plurality of features comprising:
a first distortion feature that is indicative of a difference between a position of a previously aligned word sequence and a currently aligned word sequence with respect to at least one word sequence in the first set of word sequences and the respective word sequences in the second set of word sequences or an empty word sequence; and
a second distortion feature that is indicative of a difference between:
an actual position of the currently aligned word sequence in the second electronic document relative to the previously aligned word sequence in the second electronic document; and
an expected position of the currently aligned word sequence in the second electronic document, the expected position being adjacent to the previously aligned word sequence; and
a ranker component that outputs a ranked list of word sequence pairs, wherein the word sequence pairs comprise a word sequence in the first set of word sequences and a word sequence in the second set of word sequences, wherein the ranked list of word sequence pairs are ranked in an order based at least in part upon the first distortion feature and the second distortion feature and that is indicative of an amount of parallelism between word sequences in the word sequence pairs.

10. The computing apparatus of claim 9, wherein the components further comprise a comparer component that compares scores assigned to the word sequence pairs with a threshold score and selects the word sequence pair with a highest score as including word sequences that are parallel to one another.

11. The computing apparatus of claim 9, wherein the ranker component outputs the ranked list of word sequence pairs based at least in part upon word sequence alignment between the first electronic document and the second electronic document.

12. The computing apparatus of claim 9, wherein the first electronic document and the second electronic document are a first web page and a second web page, respectively.

13. The computing apparatus of claim 12, wherein the first web page and the second web page belong to an online collaborative encyclopedia.

14. The computing apparatus of claim 13, wherein the first set of word sequences in the first web page is in a first language and the second set of word sequences in the second web page is in a second language.

15. The computing apparatus of claim 9, wherein the plurality of features further comprise one or more of a feature derived from word alignments between the first electronic document and the second electronic document, a feature derived from a markup of the first electronic document or the second electronic document, or a word-level induced lexicon feature.

16. A computer-readable data storage device comprising instructions that, when executed by a processor, cause the processor to perform acts, comprising:
receiving a first web page that comprises a first set of word sequences in a first language;
receiving a second web page that comprises a second set of word sequences in a second language, wherein the first web page and the second web page are web pages in a collaborative encyclopedia, wherein the first web page and the second web page are directed toward same subject matter, wherein the first web page comprises a first hyperlink to the second web page and the second web page comprises a second hyperlink to the first web page;

automatically correlating the first web page and the second web page based at least in part upon the first hyperlink and the second hyperlink;

assigning a score to a plurality of word sequence pairs, wherein a word sequence pair comprises a word sequence in the first set of word sequences and a word sequence in the second set of word sequences, wherein the score is indicative of an amount of parallelism between word sequences in the word sequence pairs, and wherein the score is assigned based at least in part upon a plurality of features comprising:

a first distortion feature that is indicative of a difference between a position of a previously aligned word sequence and a currently aligned word sequence with respect to at least one word sequence in the first set of word sequences and the respective word sequences in the second set of word sequences or an empty word sequence; and a second distortion feature that is indicative of a difference between:

an actual position of the currently aligned word sequence in the second electronic document relative to the previously aligned word sequence in the second electronic document; and an expected position of the currently aligned word sequence in the second electronic document, the expected position being adjacent to the previously aligned word sequence; and comparing a highest score assigned to a word sequence pair amongst all scores assigned to word sequence pairs that comprise a first word sequence to a threshold value; and if the highest score is above the threshold value, outputting data that indicates that the word sequences in the word sequence pair that has been assigned the highest score are parallel to one another.

17. The method of claim 1, wherein the plurality of features further comprises one or more of a feature derived from word alignments between the first electronic document and the second electronic document, a feature derived from a markup of the first electronic document or the second electronic document, or a word-level induced lexicon feature.

18. The computer-readable data storage device of claim 16, wherein the plurality of features further comprises one or more of a feature derived from word alignments between the first electronic document and the second electronic document, a feature derived from a markup of the first electronic document or the second electronic document, or a word-level induced lexicon feature.

19. The method of claim 4, wherein at least one of the first web page or the second web page is a web page pertaining to news items.

20. The method of claim 1, wherein the plurality of features further comprises an image feature indicating whether a word sequence in the first set of word sequences and a word sequence in the second set of word sequences are both captions of an image.

\* \* \* \* \*